United States Patent

Buck

[15] 3,636,786
[45] Jan. 25, 1972

[54] DRIVE ADJUSTMENT FOR FIXED CENTER DRIVE

[72] Inventor: Leo V. Buck, Herrin, Ill.
[73] Assignee: Fedders Corporation, Edison, N.J.
[22] Filed: Sept. 3, 1970
[21] Appl. No.: 69,232

[52] U.S. Cl............74/242.11 R, 74/242.13 R, 74/242.15 R
[51] Int. Cl...........................................F16h 7/12, F16h 7/10
[58] Field of Search..........74/242.11 R, 242.11 C, 242.15 R, 74/242.13 R

[56] References Cited

UNITED STATES PATENTS

| | | | |
|---|---|---|---|
| 2,506,516 | 5/1950 | Moore | 74/242.11 R X |
| 2,986,917 | 6/1961 | Smith | 74/242.13 R |
| 3,324,689 | 6/1967 | Bergman | 74/242.11 R X |
| 3,091,974 | 6/1963 | Brill et al. | 74/242.15 R |
| 3,324,691 | 6/1967 | Smith | 74/242.11 R X |

*Primary Examiner*—Leonard H. Gerin
*Attorney*—Kane, Dalsimer, Kane, Sullivan and Kurucz

[57] ABSTRACT

A motor, having a shaft, is pivotally mounted for rotation about an axis parallel to but displaced from the axis of the shaft. First and second pulleys are mounted on said shaft for driving a pair of rotatable devices through first and second belts respectively. A spring mounted idler applies a predetermined tension to the second belt and a stop member is mounted to the motor for preventing the idler from contacting the second pulley when the second belt is either broken or removed. The stop is positioned so that the idler exerts upon the motor a predetermined moment about the axis when the idler contacts the stop and said moment establishes the proper tension of the first belt.

8 Claims, 3 Drawing Figures

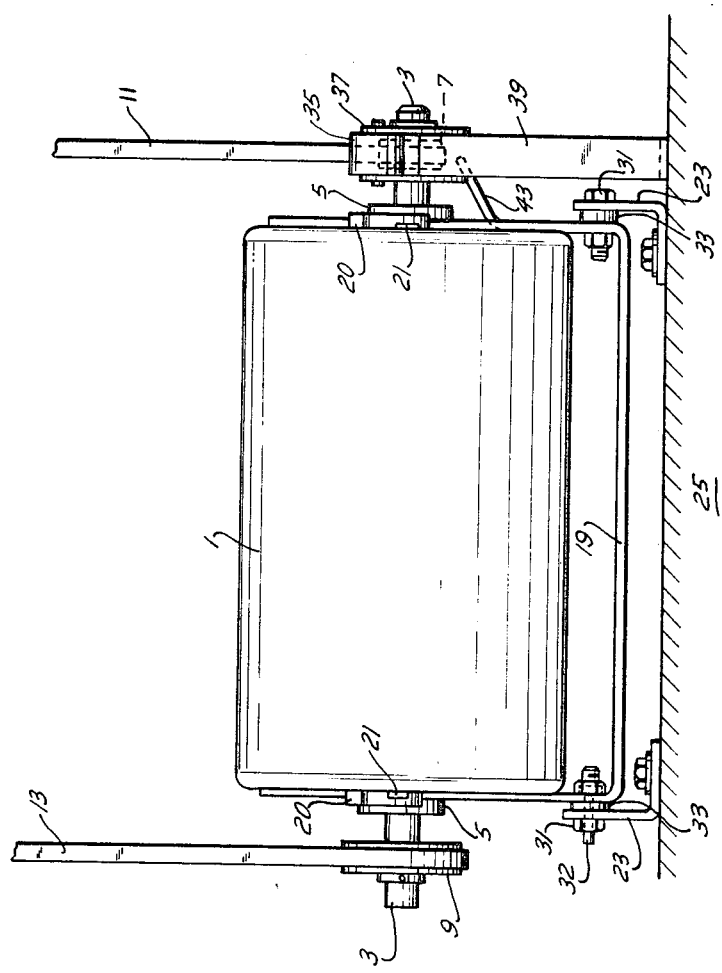

INVENTOR
LEO V. BUCK

DRIVE ADJUSTMENT FOR FIXED CENTER DRIVE

BACKGROUND OF THE INVENTION

1. Field of the Invention

This invention relates to apparatus for tensioning belts on belt driven devices and more particularly to apparatus for tensioning belts replaced during field service.

2. Description of the Prior Art

Heretofore, when a single motor was utilized to drive two belt driven devices two tensioning mechanisms were required, one for each belt drive. Separate tensioning mechanisms were required to individually adjust the tension of each belt because if the motor itself was adjusted the proper tension was not provided for each belt.

Proper tensioning of belts was not a problem when adjustment was made at the factory where test equipment was readily available. However, in the field the serviceman did not have the proper equipment for measuring the tension applied to the belts. This equipment was by necessity sophisticated and was generally not available to the field serviceman for reasons of economy and because of the delicate nature of such measuring equipment.

Thus, in the prior art it was required to have two tensioning devices, one for each belt and it was difficult to properly adjust the tension because the measuring equipment was not available to the serviceman. Even if the equipment were available it would be difficult to use when the drier was completely assembled. As a result replacement belts were improperly tensioned causing undue bearing wear and reduced bearing life necessitating expensive bearing repair at a later date.

SUMMARY OF THE INVENTION

The present invention contemplates a motor having first and second drive pulleys for driving a clothes drier fan and drum through first and second belt drives respectively. The motor is pivotally mounted for rotation about an axis that is displaced from but parallel to the axis of the drive pulleys. Mounting screws are provided for locking the motor in place once the proper tension has been established on the first belt. An idler pulley is spring mounted and positioned to apply a predetermined tension to the second belt. Thus, the idler pulley exerts a predetermined tension upon the second belt to assure its proper tensioning despite the position of the motor which was adjusted to properly tension the first belt.

A stop member is mounted to the motor to prevent the idler from contacting the second pulley when the second belt breaks or is removed. The stop member is positioned so that the idler exerts a predetermined moment on the motor about the pivotal axis and the moment exerted on the motor provides the proper tension for the first belt when the motor is free to rotate.

Thus, when the first belt is replaced in the field the mounting screws are loosened so that the motor is free to rotate about the pivotal axis and the second belt is removed so that the idler contacts the stop and exerts the proper moment on the motor which in turn establishes the predetermined tension on the first belt. The mounting screws are then tightened to lock the motor in place and the belt is under the proper tension. The second belt is then installed and the idler, being at a predetermined spring tension, exerts the proper tension on the second belt. Thus both belts are tensioned properly without the need for sophisticated measuring equipment in the field.

One object of the present invention is to provide a belt drive system having self-contained means for tensioning the belts.

Another object of the present invention is to provide a belt drive system having self-contained means for providing a predetermined tension on the belts.

Another object of the invention is to provide a belt driven system that does not require measuring equipment to provide the proper belt tension.

The foregoing and other objects and advantages of the invention will appear more fully hereinafter from a consideration of the detailed description which follows taken together with the accompanying drawings wherein one embodiment of the invention is illustrated by way of example. It is expressly understood however, that the drawings are for illustration purposes only and are not to be construed as defining the limits of the invention.

DESCRIPTION OF THE DRAWINGS

In the drawings:

FIG. 1 is a front elevation view of an apparatus constructed in accordance with the present invention.

DESCRIPTION OF THE INVENTION

Figure 2:
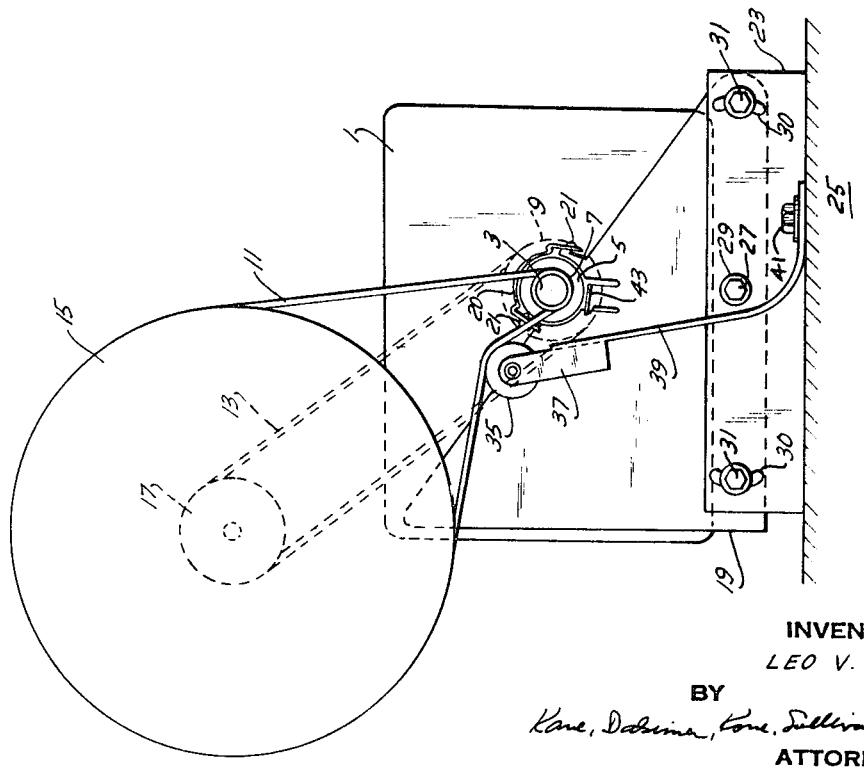
FIG. 2 is a right side-elevation view of the apparatus of FIG. 1 shown with two belts installed.

Referring to FIGS. 1 and 2 there is shown a motor having a shaft 3 extending therethrough and mounted on bearings 5 positioned at each end of motor 1. A pulley 7 is mounted on one end of shaft 3 and a pulley 9 is mounted on the opposite end of the shaft. A belt 11 drivably connects pulley 7 with a pulley 15 which is connected to a drum of a clothes drier for rotating the same during a clothes drying operation. A belt 13 drivably connects pulley 9 with a pulley 17 which is connected to a fan located within a clothes drier for circulating air therein. Motor 1 is fixedly mounted within a U-shaped bracket 19 by spring clamps 20 which fit over bearings 5 and engage hooks 21 formed in bracket 19. Angle brackets 23 are attached to a base 25 of the clothes drier and U-shaped bracket 19 is pivotally mounted to the angle brackets for rotation about a pivotal axis. One side of bracket 19 is mounted to the associated angle bracket by a bolt 27 and a bushing 29 the other side of bracket 19 has a projecting pin 32 welded thereto and inserted in an opening in the associated angle bracket 23. Bolt 27 and pin 32 are aligned along the pivotal axis to allow for rotation of the U-shaped bracket. Angle brackets 23 have arc-shaped slots 30 formed therein for receiving mounting screws 31. Slots 30 form segments of a circle around the pivotal axis for allowing approximately 16° of rotation of motor 1 about the pivotal axis. Spacers 33 are provided between U-shaped bracket 19 and the angle brackets 23 to prevent distortion of brackets 19 and 23 when screws 31 are tightened.

An idler pulley 35 is rotatably mounted in a bifurcated portion 37 of a spring metal arm 39. Arm 39 is attached to base 25 by a mounting screw 41. Spring metal arm 39 has a known spring constant and when in a position as shown in FIG. 2 it exerts a known force on belt 11 through idler pulley 35 to establish a predetermined tension of approximately 17 pounds on belt 11. A stop 43 is formed from U-shaped bracket 19 by bending a portion of the bracket outward to prevent idler 35 or the bifurcated portion 37 of arm 39 from contacting pulley 7 when belt 11 is removed. Stop 43 also functions to prevent pulley 7 from being damaged should belt 11 break during operation.

Figure 3:
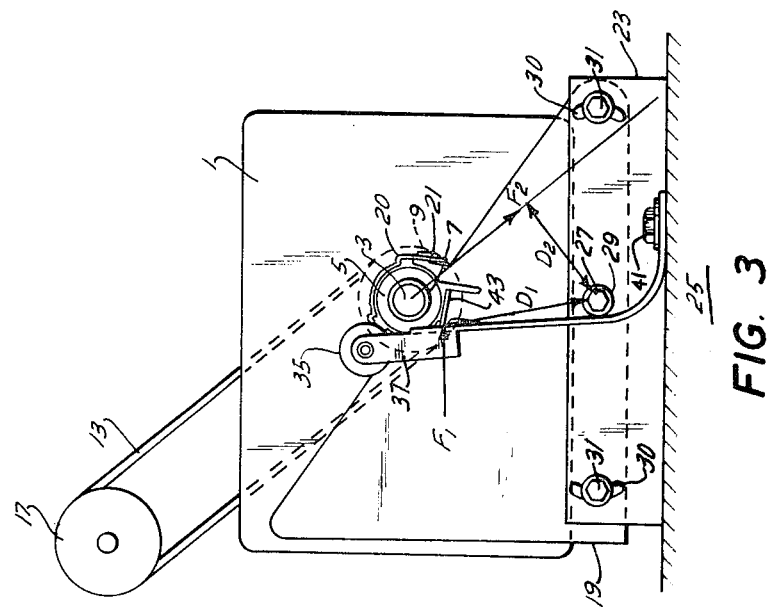
FIG. 3 is a right side-elevation view of the apparatus of FIG. 1 shown with one of the belts of FIG. 2 removed.

Referring to FIG. 3 the apparatus is shown with belt 11 removed and the spring metal arm 39 in contact with stop member 43 preventing the bifurcated portion 37 from contacting pulley 7 thus protecting pulley 7 from damage. Arm 39 exerts a force $F_1$ of approximately 14 pounds which is calculated from the spring constant, on stop member 43 at a distance $D_1$ from the pivotal axis through mounting bolts 27. This force exerts a clockwise moment about the axis through bolts 27 and causes motor 1 to rotate in a clockwise direction if and when screws 31 are loosened to allow rotation of motor 1.

When it is necessary to replace belt 13 the serviceman can loosen screws 31 and remove both belts 11 and 13 while rotating motor 1 against spring arm 39 to the proper position for removing the belts. New belt 13 is installed and spring arm 39 creates a moment about the axis through bolt 27 equal to $F_1$ $D_1$. This moment creates a tension on belt 13 equal to $F_2$ which acts in a direction along a line drawn between the center of pulleys 9 and 17 as shown in FIG. 3. Force $F_2$ acts at a distance $D_2$ from the pivotal axis such that the moment $F_1 D_1$ equals $F_2 D_2$. Distance $D_2$ and the desired tension which equal $F_2$ are known values along with the spring force $F_1$ leaving distance $D_1$ the only unknown in the equation. Thus, by use of this equation the proper position for stop 43 may be calculated for any desired belt tension. Thus, while screws 31 are loose and belt 11 removed the apparatus automatically exerts the proper tension on belt 13 at which time screws 31 may be retightened with assurance that belt 13 is under the proper tension. Belt 11 is then replaced and idler 35 is allowed to ride on belt 11 exerting the predetermined force thereon to establish the desired tension on belt 11. When replacing belt 11 it may be necessary to loosen bolt 41 to relieve the force exerted by arm 39 so that the belt may be replaced without unnecessary difficulty.

Spring metal arm 39 is initially chosen to establish the proper tension on belt 11 and then the position $D_1$ of stop 43 is determined by use of the equation $F_1 D_1 = F_2 D_2$ to establish the proper tension for belt 13. Thus, a single spring member such as arm 39 may be used to establish different tensions in two different belts.

Bracket 19 may be mounted for lateral movement rather than rotational movement if the movement is in a direction that will vary the distance between at least one pair of pulleys. In such an embodiment arm 39 and stop 43 are positioned so that the component of force $F_1$ in a direction along the line drawn between the axes of pulleys 9 and 17 exactly equals the desired tension on belt 13.

Thus, the present invention provides an apparatus for properly tensioning belts in a belt driven system without requirement for separate tensioning devices for each belt in the system. The apparatus merely requires the selection of a spring metal arm having a known spring constant and the proper positioning of stop 43.

What is claimed is:

1. In combination with a belt drive system having a single motor driving two devices through first and second belt drives each having a pair of pulleys and a belt, the improvement which comprises:
   means for mounting said motor for free movement in directions to vary the distance between the pulleys of at least the first belt drive;
   means for securing said motor in a selected position;
   spring means for applying a predetermined tension to the belt of the second belt drive; and
   a stop member mounted to said motor for intercepting said spring means and absorbing the force therefrom when the second belt upon which it acts is removed, the stop member being positioned so that a predetermined tension is applied to the belt of the first belt drive when the motor is free to move, whereby the first belt is under a predetermined tension which is maintained when the motor is secured by said securing means and the second belt is properly tensioned by the spring means.

2. A system as described in claim 1, wherein the stop member is also positioned to prevent said spring means from contacting the pulley of the second belt drive when the second belt breaks during operation.

3. A belt drive system as described in claim 1, wherein the motor is slidably mounted by said mounting means to allow for free movement in a direction to vary the distance between the pulleys of at least the first belt drive.

4. A belt drive system as described in claim 1, wherein the motor is pivotally mounted for rotation about an axis parallel to but displaced from a shaft axis of the motor.

5. A belt drive system as described in claim 4, wherein the rotation axis is displaced from a line between the pulleys of the first belt drive.

6. A belt drive system as described in claim 4, wherein the stop member is positioned so that a predetermined moment is applied to the motor about the rotation axis when the belt of the second belt drive is removed, said moment establishing the proper tension on the belt of the first belt drive when the motor is free to rotate about the rotation axis.

7. A belt drive system as described in claim 1, wherein the spring means comprises:
   a spring metal arm having a known spring constant and a fixed end portion;
   a bifurcated mounting portion formed on the other end of said spring arm; and
   an idler pulley rotatably mounted within the bifurcated portion of the arm and positioned to contact the belt of the second belt drive.

8. A belt drive system, comprising:
   a motor having a rotating shaft;
   a pair of drive pulleys mounted to said shaft;
   a pair of drive pulleys mounted to drive devices;
   a pair of belts connecting the drive and driven pulleys;
   means for pivotally mounting said motor for rotation about an axis parallel to the shaft axis;
   means for securing said motor in a selected position;
   spring means for applying a predetermined tension to one of said belts; and
   a stop member fixedly connected to the motor for intercepting said spring means when the belt upon which it acts is removed, the stop member being positioned so that the spring means exerts a predetermined moment on the motor about the rotation axis, said moment establishing the proper tension on the other belt when the motor is free to rotate.

* * * * *